(No Model.)

H. W. ROSS.
SNAP HOOK.

No. 493,300. Patented Mar. 14, 1893.

Witnesses:
J. D. Garfield
K. S. Clemons

Inventor:
Henry W. Ross,
per Chapin & Co. Attys.

UNITED STATES PATENT OFFICE.

HENRY W. ROSS, OF SPRINGFIELD, MASSACHUSETTS.

SNAP-HOOK.

SPECIFICATION forming part of Letters Patent No. 493,300, dated March 14, 1893.

Application filed October 31, 1892. Serial No. 450,511. (No model.)

*To all whom it may concern:*

Be it known that I, HENRY W. ROSS, a citizen of the United States, residing at Springfield, in the county of Hampden and State of Massachusetts, have invented new and useful Improvements in Snap-Hooks, of which the following is a specification.

The object of this invention is to devise a snap-hook so that while the ring or eye to be engaged may be snapped into place with the utmost ease, as usual, and maintained with all security, the disengagement of the eye-part from the hook may be accomplished with unusual facility and speed.

To this end the invention consists in a hook constructed as will hereinafter particularly appear and be set forth in the claim.

Figure 1:
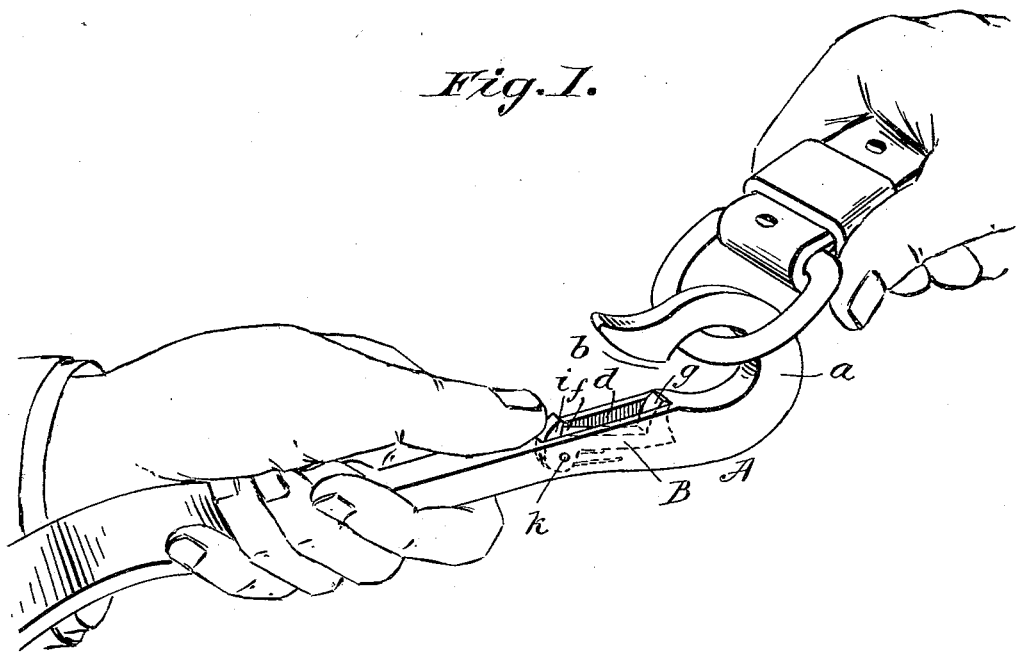
Figure 2:
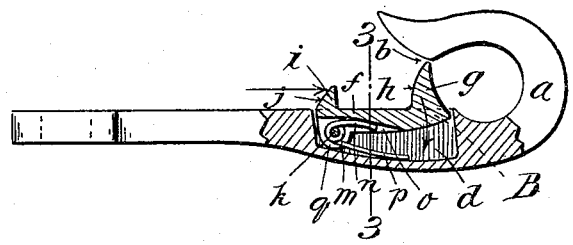
Figure 3:
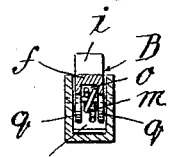

In the accompanying drawings this improved snap-hook is illustrated,—Figure 1 being an illustration in perspective thereof and showing the manner of manipulation for permitting the disengagement of the eye-member. Fig. 2 is a side view of the hook with a portion thereof comprising the snap device in central longitudinal section. Fig. 3 is a cross section on line 3—3, Fig. 2.

In the drawings A represents the hook proper of which the portion at $a$ is herein referred to as the hook-bend with the throat at $b$. The hook proper at the shank portion thereof forming the boundary at one side of the throat has the recess, $d$, within which the snap device, B, is provided.

This snap device comprises the bar, $f$, having by the pivot, $k$, the connection with the shank of the hook proper. This bar at its inner end has the angularly projected member, $g$, which normally projects across the throat for the effectual obstruction thereof, the same, however, being capable of disposition within the said recess as obvious. The back of the said member, $g$, is inclined relative to the line of the swinging movement of such part as indicated at $h$, and the said snap-bar farther from the hook-bend, and preferably near the pivot as shown, is provided with the angularly extended arm, $i$, which also has its back or surface the farther from the hook-bend beveled or inclined relative to the line of its swinging-movement as seen at $j$.

The snap-bar is recessed within its under or inner side and is also provided with the ear-lugs, $q$, $q$, through which the said pivot, $k$, is passed, while between these lugs, and encircling the pivot, is the intermediate coil of the spring, $m$, one terminal leg or member thereof bearing within the recess against the snap-bar exerting a tendency upon the latter to close the throat of the hook, the other leg, $p$, of the spring having its bearing against the base of the recess in the hook-shank.

It will be quite apparent that as the eye or loop is drawn into the throat of the hook the snap imparts no substantial resistance thereto, for if the eye strikes either or both the members, $i$, $g$, in its movement into the throat, it insures the swinging of the snap so that the eye freely passes by and no liability exists of the part becoming disengaged, accidentally; while, at will, by merely exerting a slight thumb pressure against the aforesaid short arm, $i$,—as seen in Fig. 1,—the snap is swung against the spring within the recess and away from all obstruction at the throat.

By the provision of the recess within the under side of the snap-bar, and the pivotal mounting of the latter as shown within the recessed shank of the hook, compact dispositions of the parts are permitted enabling, nevertheless, a simple and effective application of the spring.

Having thus described my invention, what I claim, and desire to secure by Letters Patent, is—

In a snap-hook the combination with the hook proper having in a portion thereof at the throat, the recess, $d$, of the snap consisting of the bar, $f$, having the angular member, $f$ with the inclined back, and the arm, $i$ with the inclined back, and also having within its inner side the recess with lugs at either side thereof, the pivot, $k$, passed through said lugs and through the shank of the hook, and the spring having intermediately thereof the coil which encircles the pivot and having its one spring member lying against the base of the recess in the hook shank and the other spring member bearing against the snap-bar within the recess therein, substantially as described.

HENRY W. ROSS.

Witnesses:
H. A. CHAPIN,
K. I. CLEMONS.